(12) United States Patent
Remy

(10) Patent No.: US 8,084,085 B2
(45) Date of Patent: Dec. 27, 2011

(54) COATED MICROSTRUCTURES AND METHODS OF COATING SAME

(75) Inventor: Christophe Remy, Thomery (FR)

(73) Assignee: Corning Incorporated, Corning, NY (US)

( * ) Notice: Subject to any disclaimer, the term of this patent is extended or adjusted under 35 U.S.C. 154(b) by 453 days.

(21) Appl. No.: 11/016,093

(22) Filed: Dec. 17, 2004

(65) Prior Publication Data

US 2005/0170142 A1  Aug. 4, 2005

(30) Foreign Application Priority Data

Dec. 24, 2003 (EP) .................................. 03293327

(51) Int. Cl.
- B05D 7/22 (2006.01)
- B05D 1/02 (2006.01)
- B05D 1/18 (2006.01)
- B05D 1/28 (2006.01)

(52) U.S. Cl. ..... 427/235; 427/236; 427/368; 427/421.1; 427/429; 427/430.1; 977/895

(58) Field of Classification Search .................. 427/230, 427/235, 238, 368, 429, 430.1, 236, 421.1, 427/237; 204/192.1; 977/895–899
See application file for complete search history.

(56) References Cited

U.S. PATENT DOCUMENTS

| | | | |
|---|---|---|---|
| 3,941,719 A | 3/1976 | Yoldas | 252/463 |
| 5,543,125 A * | 8/1996 | Uchida et al. | 423/239.2 |
| 5,585,136 A | 12/1996 | Barrow et al. | 427/2.24 |
| 5,746,901 A * | 5/1998 | Balch et al. | 204/606 |
| 5,853,446 A | 12/1998 | Carre et al. | 65/17.3 |
| 5,976,472 A | 11/1999 | Chatterjee et al. | 422/130 |
| 6,036,927 A * | 3/2000 | Chatterjee et al. | 422/211 |
| 6,284,682 B1 | 9/2001 | Troczynski et al. | 501/12 |
| 6,291,392 B2 | 9/2001 | Hesse et al. | 502/234 |
| 6,426,226 B1 * | 7/2002 | Senkan | 506/11 |
| 6,595,232 B2 | 7/2003 | Guzman et al. | 137/15.01 |
| 6,923,907 B2 * | 8/2005 | Hobbs et al. | 210/198.2 |
| 7,404,936 B2 * | 7/2008 | Mazanec et al. | 422/198 |
| 2004/0046290 A1 * | 3/2004 | Kim et al. | 264/500 |
| 2004/0123626 A1 * | 7/2004 | Caze et al. | 65/17.2 |

FOREIGN PATENT DOCUMENTS

| | | |
|---|---|---|
| DE | 10111747 | 9/2002 |
| EP | 1123157 | 4/2003 |
| EP | 1340541 | 9/2003 |
| WO | WO 00/21659 A1 * | 4/2000 |
| WO | WO 01/12312 A2 * | 2/2001 |

OTHER PUBLICATIONS

English-language machine translation of the specification of DE 101 11 747 A1, obtained from EPO website, generated Jun. 11, 2009.*

* cited by examiner

Primary Examiner — William Phillip Fletcher, III
(74) Attorney, Agent, or Firm — Gregory V. Bean

(57) ABSTRACT

A method of manufacturing a microstructure includes filling a microchannel with a slurry including a sol-gel binder, removing a portion of the slurry from the microchannel such that a slurry layer is disposed on or between the plurality of microchannel walls, and heating the microstructure for a sufficient time and at a sufficient temperature to cure and bind the slurry layer to the microchannel walls.

5 Claims, 7 Drawing Sheets

COATED MICROSTRUCTURES AND METHODS OF COATING SAME

BACKGROUND

1. Field of the Invention

The present invention generally relates to microstructures, and more particularly, microstructures having coated internal surfaces for facilitating chemical processing and/or manufacture and methods of coating same.

While the present invention is subject to a wide range of applications, it is particularly well suited for improving catalytic reactions within one or more microchannels of a microreactor.

2. Technical Background

Chemical reactors are widely used in industry to carry out reactions between two or more chemical components, for example, between liquids and liquids, gases and gases, slurries and slurries, liquids and gases, liquids and slurries, gases and slurries, solids and solids, solids and liquids, solids and gases, and solids and slurries. Many of these reactors are large, fixed-site units designed for continuous operation at roughly constant throughput. These reactors typically have a conventional shell-and-tube design wherein reactants pass through catalyst-containing tubes while heat, usually in the form of hot gases contained within the shell, is applied to the outside of the tube.

A major drawback to shell-and-tube type reactors in general is the size of the reactors themselves. Their relatively large size makes these reactors less desirable for use in applications requiring a more compact reactor. These and other conventional processing equipment also suffer from additional disadvantages. It has long been recognized in the chemical industry that "scale-up" from laboratory bench scale to commercial production scale is difficult. Results achieved in the laboratory are often difficult at production rates in production facilities. The conventional wisdom of "economy of scale" is based upon economic considerations which relate production rate (units of production per unit of time) to capital investment. This conventional approach results in less than optimum precision of control of chemical processing.

In recent years, these and other shortcomings have been largely overcome with the advent of microstructure/microreactor technology. Microreactors, i.e., structures having one or more microchannels through which fluids may be passed, processed, analyzed, and/or caused to react, although in their infancy, have been successfully developed and operated for homogeneous applications (applications where a plurality of reactants or the reactant(s) and catalyst(s) are in the same phase, for example, the liquid phase). Although microreactors and microreactor systems have been developed for heterogeneous applications, i.e., applications where the plurality of reactants or the reactant(s) and the catalyst(s) are in different phases, such microreactors have met with substantially less success.

Generally speaking, typical heterogeneous applications within microreactors involve the use of one or more catalyst (s). A catalyst increases the rate of a reaction without being consumed by it, and typically operates by lowering the activation energy for a chemical reaction. Most commonly, the preferred catalyst for use in microreactors is a solid catalyst that increases the rate of a fluid phase (gas, liquid, or gas-liquid) reaction. An optimum catalyst should have the preferred attributes of activity, selectivity, stability, and regenerability. Unfortunately, obtaining and retaining all of these catalyst attributes in the field of microreactors is a difficult task.

While microreactors have been manufactured from materials such as silicon, the vast majority of microreactors have been fabricated from metals, such as stainless steel. Accordingly, most of the research relating the use of catalysts in microreactors has been directed to the use of catalysts in metal microreactors. One widely used approach in such metal microreactors is to tightly pack a plurality of small solid particles of catalyst material within the microreactor microchannel, and thereafter flow the reactant(s) across the, "packed-bed." The predominate drawback of such a technique is the pressure drop created within the microreactor when utilizing such an approach. Additionally, in multi-channel microreactors, or microreactors in parallel, differential drops in pressure will significantly effect performance. Moreover, stability of the packed-bed is an issue as rapid flow velocities within the microchannel(s) tend to displace the catalyst particles leading to catalyst attrition and then decreased performance, and the need for a filtration step.

As a result of these shortcomings, attempts have been made to coat the microchannel walls within metal microreactors. Suitable coating techniques have included dip coating, brushing, spraying, and sputtering. Due in particular, however, to the co-efficiency of thermal expansion differences between the metallic wall surfaces of such microreactors and the catalyst carrier, particularly alumina, it is extremely difficult with conventional coating technology to have strong coating adherence to the microchannel walls utilizing such approaches, as it is well known that the adhesion of typical catalyst carriers to metal is very poor. This is particularly true when coating thicknesses exceed several tens of microns.

SUMMARY

In one aspect, the disclosed microstructure is for chemical processing and manufacture. The microstructure includes a plurality of microchannel walls defining at least one microchannel for accommodating chemicals to be processed, and at least one coating layer including a support and an active element disposed on or between the plurality of microchannel walls using a slurry containing a catalyst or a catalyst support powder and a sol-gel binder.

In another aspect, the disclosed method is for manufacturing a microstructure for enhanced chemical processing and manufacture. The method includes the steps of filling a microchannel configured to accommodate chemicals to be processed and defined by a plurality of microchannel walls with a slurry including a sol-gel, removing a portion of the slurry from the microchannel such that a slurry layer is disposed on or between the plurality of microchannel walls, and heating the slurry layer for a sufficient time and at a sufficient temperature to cure and bond the slurry layer to the plurality of microchannel walls.

The disclosed microstructure and method provide a number of advantages over other microstructures and methods known in the art using, for example, packed-bed or coating made by conventional coating technology. The micro-scale internal dimensions of the reaction channel coated in accordance with the disclosed method maximizes reactant(s)/catalyst(s) contact within the reaction channel without a drop in internal pressure. As a result, the reaction rate is maximized within the disclosed microstructure microchannel(s). Moreover, the disclosed coated microchannel walls provide homogeneity of fluid flow and temperature throughout the microchannels, which substantially eliminates "hot spots."

Generally, microreactor performance may be significantly improved, due in large part to the increased thickness of the catalytic coating capable of being fixedly supported on the microchannel walls of the disclosed microstructure.

The small size of the channel also provides greater control over variables such as temperature control and flow rates. Moreover, the gas/liquid, liquid/liquid, and liquid/solid mass transfer coefficients may be greatly enhanced due to the flow regime control provided inside the narrow reaction channel.

In addition, despite the non-compatibility between the material(s) forming the microchannel walls of the disclosed microstructure and the coatings used to support the selected active elements (for example, alumina coating on a metallic microreactor), such as, but not limited to, catalyst(s), the disclosed microreactor provides a strong adhesion between the coating and the microchannel walls. Accordingly, the coatings are durable, exhibit high resistance to thermal shock, are designed to withstand prolonged exposure to fluid flow (both liquid and gas-liquid), and are resistant to chipping, spalling, cracking and/or delamination.

Additional features and advantages of the disclosed microstructure and method will be set forth in the detailed description which follows and in part will be readily apparent to those skilled in the art from that description or recognized by practicing the method as described herein.

It is to be understood that both the foregoing general description and the following detailed description are merely exemplary, and are intended to provide an overview or framework for understanding the nature and character of the disclosed microstructure and method as they are claimed. The accompanying drawings are included to provide further understanding of the description, illustrate various embodiments, and together with the description serve to explain the principles and operation of the disclosed microstructure and method.

DETAILED DESCRIPTION OF THE PREFERRED EMBODIMENTS

Figure 1:
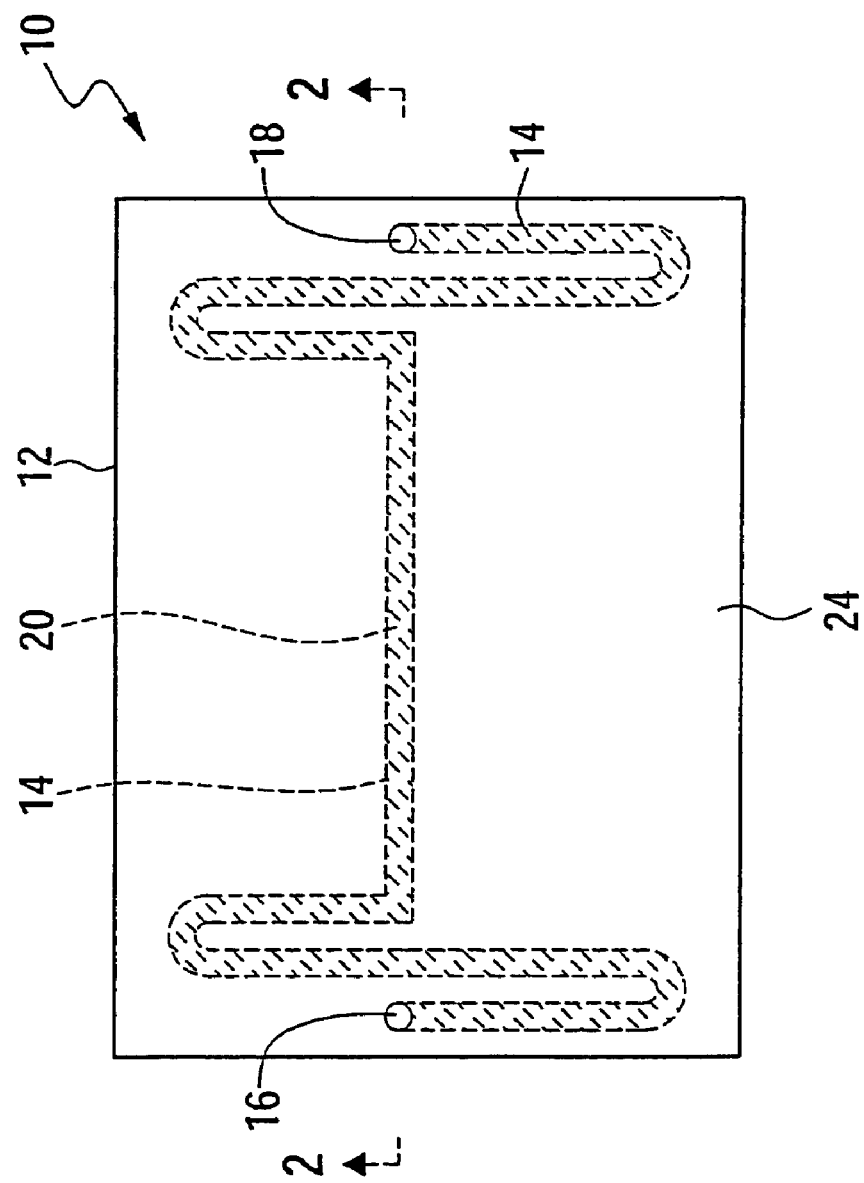
FIG. 1 is a top view of a preferred disclosed coated microstructure.

What is needed therefore but seemingly unavailable in the art, is a more efficient, and more robust approach to chemical applications, and in particular, heterogeneous applications and catalytic reactions within microstructures such as microreactors. More specifically, a microstructure having coated internal surfaces and an improved process for coating the microchannel walls, and in some cases, other internal surfaces, of a microstructure that has a coating with sufficient bonding properties for microstructures manufactured from substantially all materials, offers promising benefits for the chemical processing and manufacturing industry. Such an apparatus should provide adequate controls for any catalytic reactions occurring therein, and provide a high surface-to-volume ratio to provide for adequate interaction between the reactant(s) and the selected catalyst(s). Moreover, the coating should offer improved resistance to corrosion mechanical resistance and be able to be applied in thicknesses greater than 10.0 microns (μm) without experiencing cracking and delamination during use of the microstructure.

The disclosed microstructure is used for chemical processing applications. The disclosed microstructure is particularly well suited for supporting one or more coating layers on the interior walls bounding one or more microchannels within the device. The microchannels having walls coated with a catalyst-containing layer or layers may preferably define, among other things, a reaction chamber. Microreactors defining the reaction chambers may be stacked or otherwise arranged to increase reaction chamber activity, fluid throughput through the disclosed microreactors, and thus the volume of reactants processed, and/or chemicals manufactured.

A microfluidic microstructure based reactor system, such as the disclosed microreactor system may also include a support structure for retaining the various flow control components, mixing devices, thermal controls, sensing units, separation chambers, analyzing chambers, monitoring chambers, other types of reaction chambers, and/or any other components or devices typically associated with microfluidic microstructure chemical processing apparatus and systems known in the art.

Catalytic reactions may preferably be effectively conducted on a micro-scale. As used herein, the phrase, "conducted on a micro-scale" is intended to mean, within a microchannel, the smallest cross-sectional dimension of which is between 0.1 micron (μm) to about 3.0 millimeter (mm). Microfluidic reactors, such as the disclosed microstructure, may now be manufactured to include microchannel walls coated with one or more catalyst containing catalyst support layers, which enables efficient catalytic reactions within the micro-scale channel or channels of the microreactor. Because the channels of such a microfluidic reactor are so small, the surface area-to-volume ratio within such microchannels is extremely high. When one or more catalyst(s) are disposed within such a microchannel, there is a significant increase in reactant exposure to the catalyst, which results in greater productivity or yield as a result of, among other things, the increased reaction rate.

A microreactor having microchannel walls coated with a coating of support material and one or more catalysts and a method of manufacturing such a microreactor are provided that offer significantly improved catalyst effectiveness for slow as well as fast reactions, e.g., reactions that may involve liquid phase processing and/or that require relatively long catalyst contact, or residence times. The improved catalytic effectiveness of the disclosed microreactor is achieved through the use of a slurry composition and a deposition process of the slurry composition that results in a coating of substantial thickness and controlled porosity. The active catalyst is purposefully substantially uniformly distributed throughout the coating to achieve optimal effectiveness for the particular reactant stream and/or reactant combination being processed.

Characteristic features of these coatings, in addition to their controlled thickness and structural characteristics, are full physical integrity (substantial freedom from cracks), and high resistance to erosion even under reactor conditions involving rapid or turbulent flow conditions, whether of single phase (gas or liquid) or two-phase (gas and liquid) composition. Strong binding occurs between these coatings and the microchannel walls made of materials used to fabricate the disclosed microreactors, i.e., metal, silicon, glass, glass-ceramic and ceramic among others. Such binding characteristics simply have not been attainable in the past.

The disclosed microstructure includes a coating, applied using a sol-gel material during the process, disposed on at least the interior surfaces defining the microchannel(s) of the microchannel walls of the microreactor. The sol-gel material is used as a binder for the catalyst, and/or a catalyst support powder that is also included in the slurry. For the purpose of the present description, coated microstructures such as, but not limited to, microreactors are characterized as integral structures defining internal void spaces (microchannels, cavities, or the like) bounded by internal surfaces (or microchannel walls) and within which a reactant stream entering the microreactor for treatment comes into contact with catalytically active specie or species in the coating layer(s) disposed on the microchannel walls. Coated microstructures and coated microreactors are not intended to include monolithic extruded ceramic honeycomb structures used within catalytic converters in the automobile industry. The catalyst support, which is generally of oxide composition, will preferably have a predetermined porosity. The microstructure itself, including the microchannel walls, may preferably be of metal, silicon, glass, glass-ceramic and/or ceramic composition. In addition, the microchannel walls may be solid structures, or may be porous structures, such as porous membranes.

In the case of a preferred microreactor, the catalyst support may be coated on the channel walls as a thick porous inorganic catalyst support layer. That layer will occupy a percentage of the surface of the microchannel cross-section when the cross-section is taken perpendicular to the flow path that will completely depend on the type of chemical reaction being performed in the microreactor. An open and interconnected porosity of the catalyst support layer will preferably range from at least approximately 5%, and more preferably from at least approximately 30%. The catalyst support layer preferably has a mean pore size in the range from about 0.2 to $10^4$ nanometers (nm). For certain microchannels, the layer thickness may be at least about 2 µm (microns), more preferentially about 6 µm (microns), in a most preferred way about 10 µm (microns) and up to about several hundred microns, depending on the initial channel size. Disposed on or within the pore structure of this catalyst support will preferably be a metal, metal oxide and/or other catalytically active species having activity and selectivity for the particular reaction for which the coated microreactor is to be used.

Also disclosed is a method for making a coated microstructure as described above. In accordance with an exemplary method, a slurry is passed into a microreactor incorporating one or more internal voids or channels defined by microchannel walls preferably made of metal, silicon, glass, glass-ceramic, and/or ceramic materials. The slurry is preferably directed into the microchannel under pressure through an inlet such that the slurry completely fills the microchannel. The slurry may include a support preferably a catalyst support material, and an active element or elements, preferably a catalyst, in which case the coating may be applied to the microchannel walls in a single step. In another embodiment, the slurry may only include the support, preferably a catalyst support. In such an embodiment, the active element(s), preferably one or more catalysts may be deposited on or through the catalyst support in a second process step utilizing a catalyst impregnation technique as will be described in greater detail below.

The slurry preferably includes a liquid phase that constitutes or contains a precursor for a permanent inorganic binder for the oxide catalyst support. The inorganic binder, typically a metal oxide binder, is selected for its effectiveness in forming an adherent coating of the desired internal pore structure. The composition of the binder may be the same as or different from the composition of the catalyst support, and its precursor will generally be an organometallic or inorganic compound of a metal that is soluble or highly dispersible in the liquid phase of the slurry.

After the microchannel has been filled with the slurry, a portion of the slurry is removed from the microchannel such that a slurry layer coats the plurality of microchannel walls. Typically, the slurry is allowed to drain from an outlet in the microreactor using, for example, forced air circulation, vacuum aspiration, or some other fluid that is nonmiscible with the slurry. The microreactor and its included slurry layer may then preferably be dried and heated to a temperature at least sufficient to remove the liquid phase from the slurry to form a coating layer. Further heating to cure or partially sinter this layer is preferably undertaken immediately after the removal of the liquid, but may alternatively be deferred until after deposition of additional layers. Thus, following removal of the liquid phase from the coating layer, the steps of filling the microchannel with a slurry, removing at least a portion of the slurry from the microchannel, drying, and heating to remove the liquid phase can be repeated to form one or more additional coating layers on the initial coating layer. This process may be repeated until the combination of the first coating layer and any additional coating layers reaches a combined thickness that will provide the appropriate reaction kinetics for a given catalytic reaction. Final heating to cure the last and any underlying uncured coating layers may then be carried out. It should be noted that the disclosed coating may also be applied in this method by, for example, dip coating, brushing, spraying, and sputtering.

Providing a catalytically active species on or within at least one, though more preferably all, of the coating layers may be carried out either during the slurry deposition, after each coating layer has been deposited, or after all coating layers have been deposited. Moreover, catalyst impregnation may occur either before or after curing.

In a preferred embodiment, a catalyst carrier powder is dispersed into an aqueous solution to develop a slurry having the appropriate viscosity and other properties for delivery into a microchannel. While an aqueous solution may be the preferred solution, alcohol or organic solvent based solutions are also operative in the disclosed method. A sol-gel based constituent is then added to the slurry, for example using a colloidal sol-gel solution as described in U.S. Pat. No. 3,941,719, or by a process described in U.S. Pat. No. 5,585,136 or U.S. Pat. No. 6,284,682, the disclosures of which are hereby incorporated herein by reference. Additionally, a grinding operation may be performed, preferably using a wet ball-mill process, to reduce catalyst carrier particle size. The slurry viscosity may then be adjusted for compatibility with the particular application via pH adjustment, dispersing agent addition, or by dilution, for example. The coating may then be applied within the microchannel by filling the microchannel with the slurry, removing excess slurry via forced air circulation or some other process, and then by drying and firing the slurry coated microstructure. The disclosed coating may also be applied in this method by, for example, dip coating, brushing, spraying, and sputtering.

Coating layer thickness may be increased by repeating these steps described above. Preferentially, the thickness of each individual layer is greater than about 6 µm, and may be up to several hundred of microns with multiple layers. By each layer being greater than approximately 6 µm, each layer can desirably be made thicker without having to deposit multiple layers. The thickness of each layer and the total number of layers will depend on the reaction being performed in the microreactor.

Active elements such as catalysts may preferably be added during the coating process described above, being either dispersed into the slurry itself or deposited on the catalyst carrier surface powder prior to the addition of the catalyst carrier surface powder to the aqueous solution. Instead, the catalyst or other active element may be deposited in a second process step following slurry deposition as described above using conventional catalyst impregnation techniques.

The sol-gel coating process described above provides coatings having advantageous bonding properties for microstructures made of essentially any material, such as, but not limited to, metal, glass, glass-ceramic, ceramic, or silicon. Moreover, the above-described process provides for coating thickness as high as several hundreds of microns while providing significant resistance to erosion during chemical reactions and other chemical processing. In addition, the above-described process facilitates applying the catalyst support and the catalyst in a single step as the sol-gel-based coatings require lower heating conditions as compared to conventional coating processes. For example, when an alumina sol-gel binder is used as specified above, temperatures of between about 350° C. and about 450° C. during firing are generally sufficient to transform an alumina sol to an aluminum oxide. The temperature range of the heating, however, will depend on the type of sol-gel binder that is used. Moreover, the process described above facilitates the use of inorganic powders other than alumina in the slurry as the implementation of the above-described sol-gel binder and corresponding coating process may be used with any oxide, carbide or nitride materials necessary for a given catalytic application. Furthermore, the process facilitates the addition of other components to the sol-gel based slurry to provide additional functionality. For example, silicon carbide (SiC) particles may easily be added to the sol-gel based slurry to function as a heat exchanger within the resultant coating during catalytic reactions, particularly exothermic catalytic reactions.

The process thus offers the option of a completely homogenous distribution of catalyst throughout the entire thickness of the coating, or alternatively a layered coating wherein the layers may not only contain different catalytic species, but may also differ from adjacent layers as to thickness, porosity, or both. The steps that can optionally be followed to vary the composition, pore morphology, or other properties of the catalyst support for the purpose of adapting the coating to specific applications are several. For example, catalysts or other additives may be included in the slurry composition, or instead deposited on the powdered oxide catalyst support added to the slurry. The latter procedure is particularly effective to ensure a wide distribution of catalyst throughout the thickness of the catalyst support layer after curing.

Also useful, as optional slurry constituents, are pore-forming additives that can be used to modify the pore structure of the layers through subsequent thermal or chemical treatment thereof. Constituents that promote gelling of the deposited layers prior to drying may also be included in the slurry as a means to increase deposited layer thickness, modify the final coating microstructure, or control the geometrical shape of the deposited layers.

The sol-gel processing aspects of the slurry formulation provide high purity, homogeneity and low sintering temperatures. Generally speaking, a sol is a dispersion of solid particles in a liquid phase where the particles are small enough to remain suspended indefinitely by Brownian motion. For aqueous sols, this means a particle size of less than approximately 0.1 to 1.0 μm. A gel is a solid containing a liquid component in an internal network structure so that both the liquid and solid are in a highly dispersed state. In a highly viscous gel state, material can be shaped into a useful product, e.g. bulk shape, fiber, coating, etc. In typical sol-gels, organo-metallic precursor compounds of the desired ceramic oxides are mixed and dissolved in a suitable solvent. The resultant solution is then hydrolyzed to form a nano-cluster sol, and subsequently a gel composed of organo-metallic polymers or macro clusters. Additives may be added to control the viscosity and surface tension of the sol-gel. Films or coatings may then be prepared and applied to an appropriate target or substrate. The target or substrate may then be fired to remove the water and organic material and to develop the final coating structure. In accordance with the present invention, the sol-gel formulation may be combined with any carbide, oxide or nitride materials thus facilitating a wide range of catalytic reactions requiring such specific catalyst carrier supports.

Reference will now be made in detail to the disclosed microstructure and method, examples of which are illustrated in the accompanying drawing figures. Wherever possible, the same reference numerals will be used throughout the drawings to refer to the same or like parts. An exemplary embodiment of the disclosed coated microreactor is shown in FIG. 1 and is designated generally throughout by reference numeral 10. Those of skill in the art will recognize, that although the preferred embodiment will be described with reference to a microreactor, the principles of the disclosure are equally applicable and operative for any microstructure.

Generally speaking, and as depicted in FIG. 1, coated microreactor 10 preferably includes at least one reaction cell 12 for performing a catalytic reaction on a micro-scale. Reaction cell 12 may preferably include at least one microchannel 14 having an inlet 16 and an outlet 18 for the passage of a reactant(s) therethrough, and as will be described below, for the insertion and removal, respectively, of a slurry. A coating layer 20 including a catalyst support, a catalyst and a binder obtained from a sol-gel material (represented by cross-hatching) is preferably disposed within microchannel 14 such that coating layer 22 may catalytically react with any reactants passed through microchannel 14.

Figure 2:
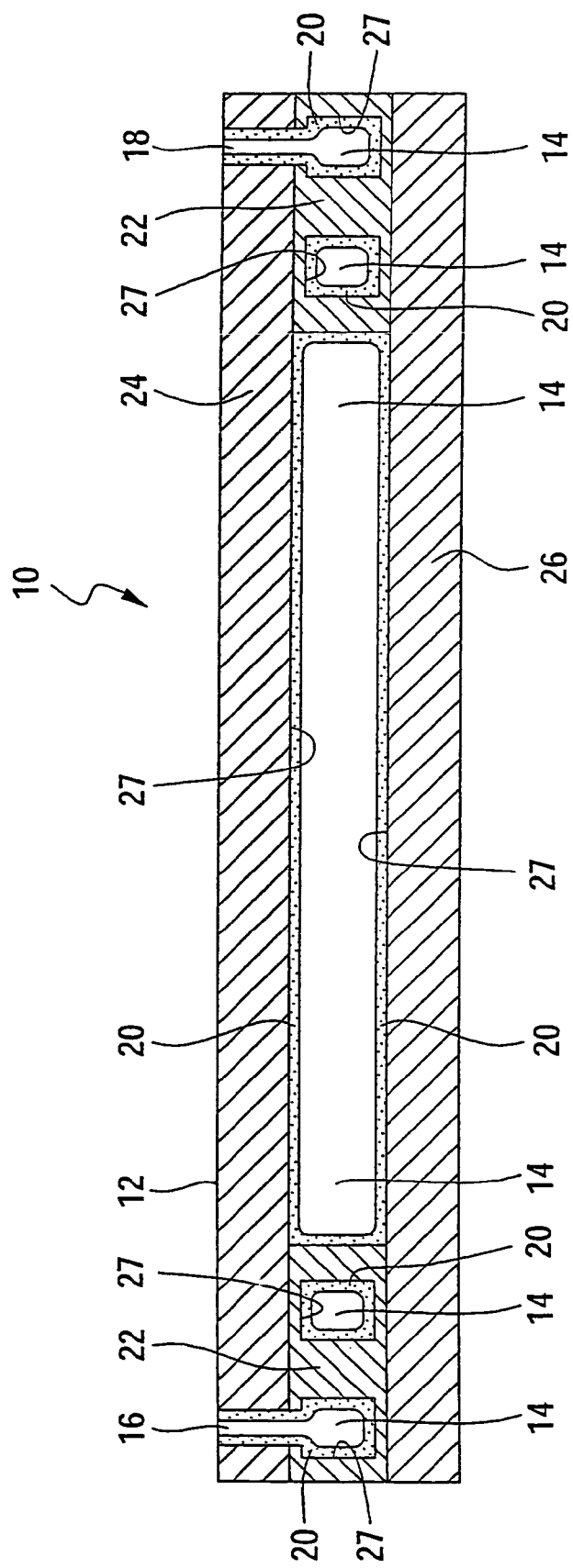
FIG. 2 is a cross-sectional view of the coated microstructure taken along lines 2-2 of FIG. 1.

Generally speaking, and as will be described in greater detail below with reference to the disclosed method of manufacturing a coated microreactor, microchannel 14 is preferably disposed between a first substrate 24 and a second substrate 26 (FIG. 2). As shown in FIG. 2, microchannel 14 is preferably defined by a plurality of microchannels walls 22. The phrase, "microchannel walls 22" is intended to mean any surface that defines microchannel 14. Accordingly, in some embodiments, microchannel walls 22 may also include those surfaces of substrate 24 and second substrate 26 that bound microchannel 14. As shown clearly in FIG. 2, all of the interior surfaces 27 of microcell 12 are coated with coating layer 20. For the embodiment depicted in FIGS. 1 and 2, substrate 24, second substrate 26 and microchannel walls 22 disposed therebetween are preferably made of glass, but they could be made of different materials or combinations of materials. As will be described in greater detail below, microchannel walls 22 may preferably be formed from glass frit that is shaped via a micromolding process atop of second substrate 26. Thereafter, first substrate 24 is affixed to the top surfaces of microchannel walls 22 to close reaction cell 12. Inlet 16 and outlet 18 may be preformed within first substrate 24 or may be bored through first substrate 24 after closure, as by, for example, drilling. Although not required, microchannel 14 may preferably be a tortuous channel, which may preferably provide static mixing functionality within reaction cell 12.

Figure 3:
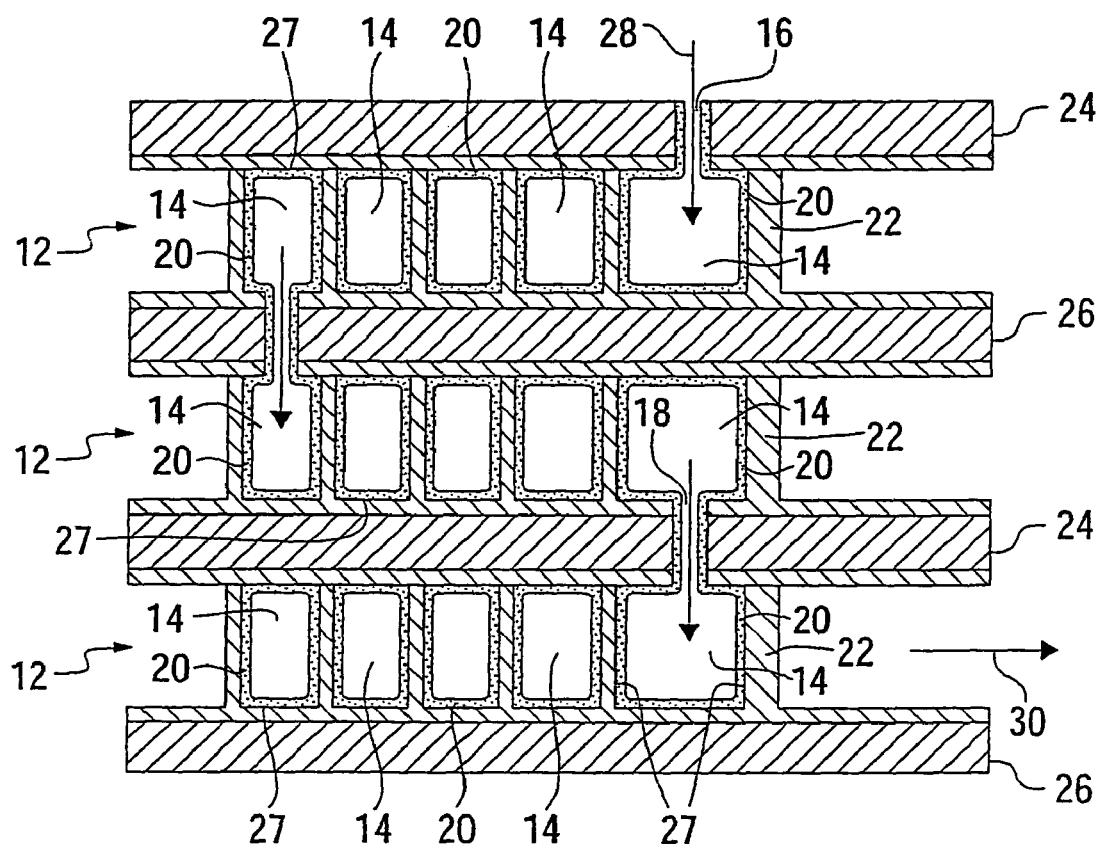
FIG. 3 is a cross-sectional view showing the operation of a coated microstructure including a plurality of stacked coated microcells.

In operation and as shown in FIG. 3, one or more reactants 28 may preferably be introduced through inlet port 16 and is preferably continuously passed through microchannel 14 formed within reaction cell 12 of coated microreactor 10. As shown in FIG. 3, a plurality of reaction cells 12 have been stacked one atop the other and are in fluid communication via aligned inlet and outlets 16 and 18. As one or more reactants 28 are preferably pumped through coated microchannel 14, one or more reactants 28 interact with the catalyst impregnated coating layer 20 on microchannel wall 22. As a result, a catalytic reaction preferably occurs within microchannel 14 and a reaction product or products 30 is thereafter passed through outlet 18 where it may preferably be further processed and/or analyzed.

The composition of the particular catalytically active species that may be impregnated within coating layer 22 is not critical, but may be determined in accordance with conventional practice, i.e., in view of the particular application or process environment within which the coating layer is to be utilized. Conventional catalysts that may be advantageously employed include at least the precious metal catalyst group VIIIA of the Periodic Table of Elements, as well as the transition metals of groups IVA, VA, VIA, VIIA and VIIIA thereof. Acceptable catalyst supports for coating layer 22 include: a binder sol or a sinterable particulate solid, such as, but not limited to, alumina, and in particular, gamma alumina, boehmites of fine particle size, silica, alumina silica; and molecular sieves such as, but not limited to, zeolites.

Figure 4:
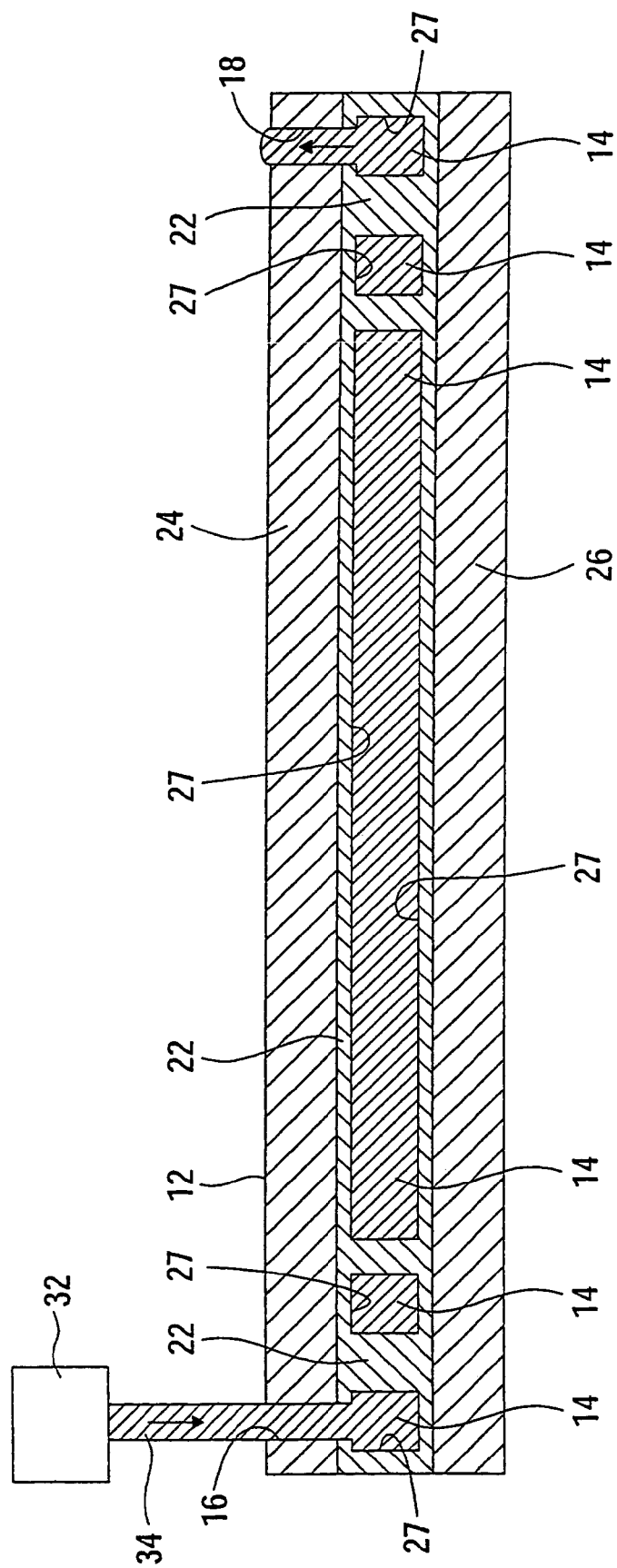
FIG. 4-6 schematically depicts a method of manufacturing the disclosed coated microstructure.

An example for a method of manufacturing a coated microreactor 10 will now be described with reference to FIGS. 4-6. As shown in FIG. 4, a source 32, such as, but not limited to, a syringe, for delivering a slurry 34 under pressure cooperates with inlet 16 to deliver slurry 34 through inlet 16 and into microchannel 14. In a preferred embodiment, slurry 34 is delivered into microchannel 14 until microchannel 14 is completely full and slurry 34 exits outlet 18. As mentioned above, at this point, slurry 34 includes a sol-gel binder, a catalyst support and may or may not include a catalyst. For the purpose of this discussion, it will be assumed that slurry 34 includes both a catalyst support and a catalyst.

Figure 5:
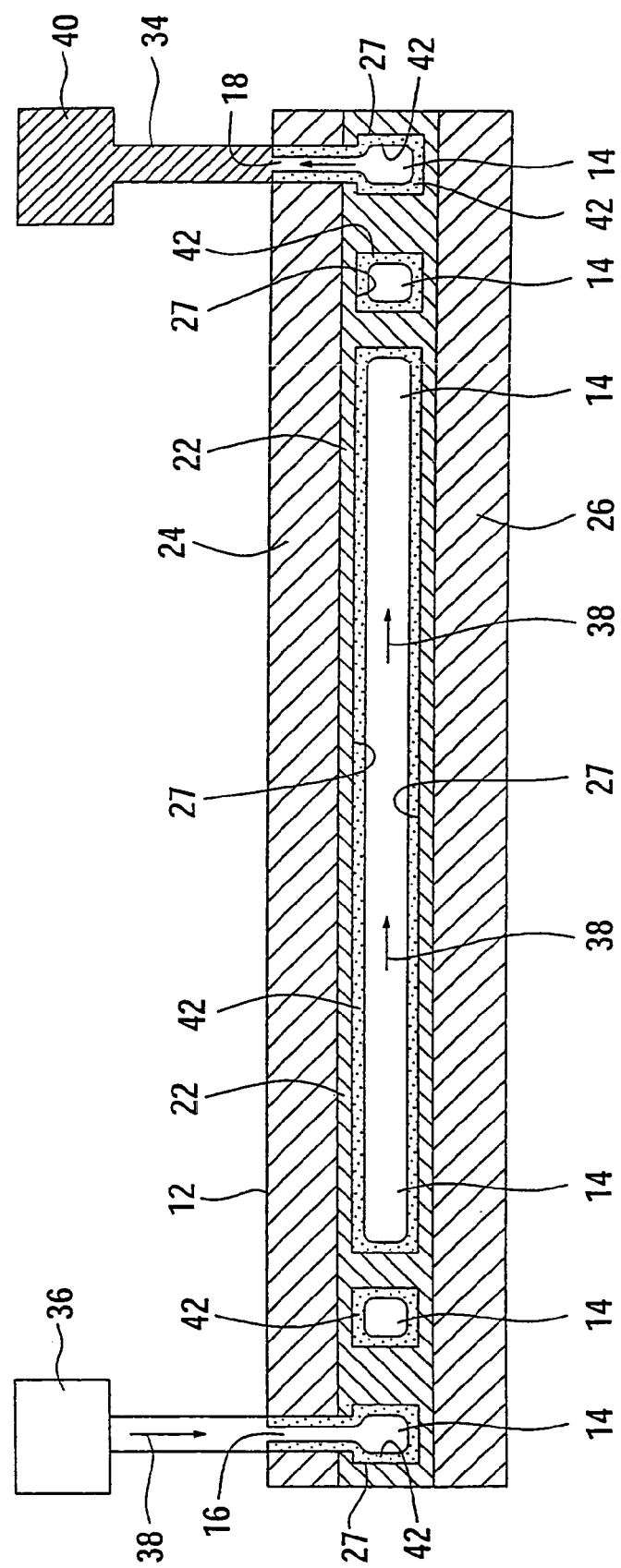
Figure 6:
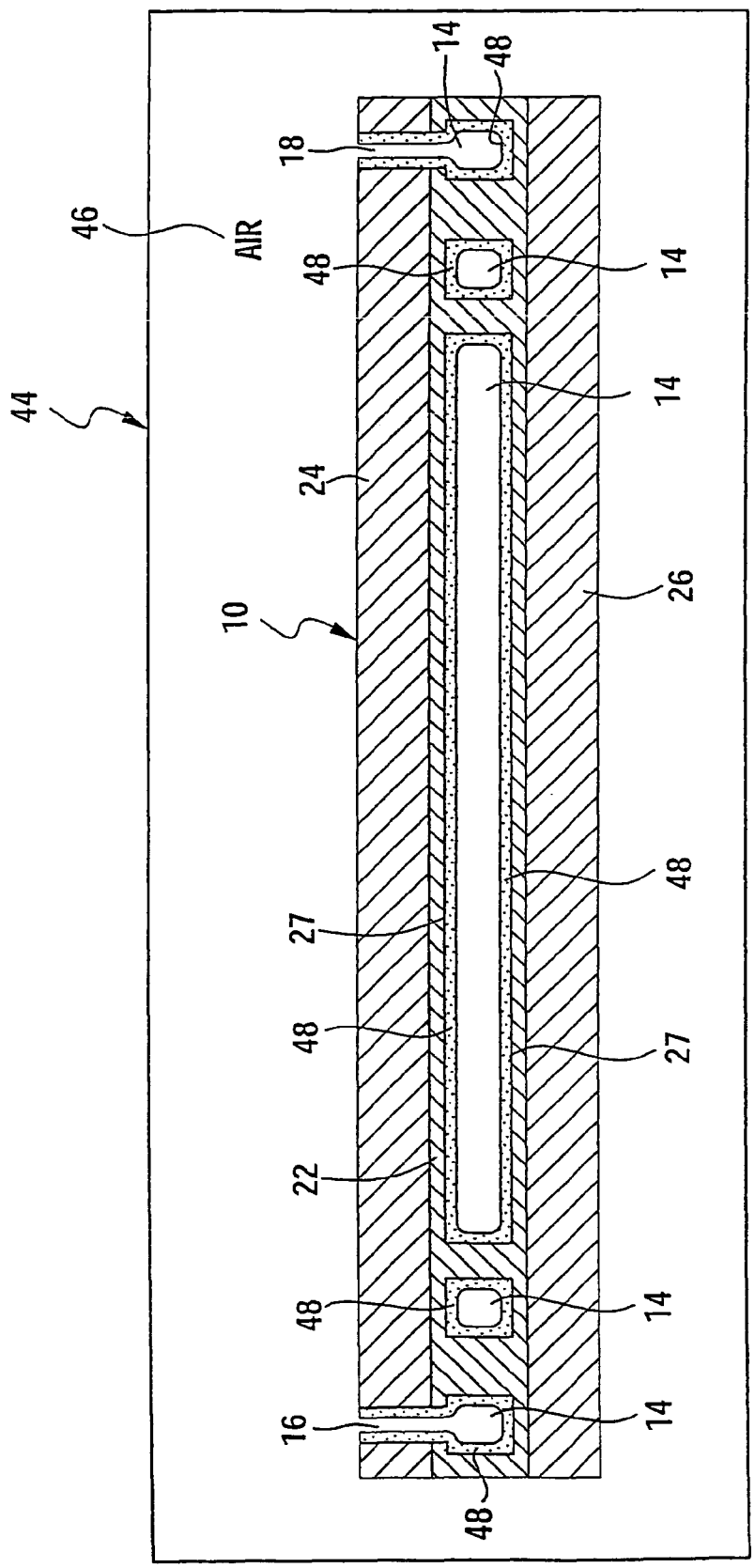

Once microchannel 14 has been filled with slurry 34 such that slurry 34 covers all of the microchannel wall surfaces 27 defining microchannel 14, at least a portion of slurry 34 is drained or otherwise removed from microchannel 14 as shown in FIG. 5. In one example, a source 36 of forced air 38 may preferably cooperate with inlet 16 to deliver forced air 38 through microchannel 14 and out outlet 18. As forced air 38 travels through microchannel 14, a substantial portion of slurry 34 is forced through outlet 18 and into a collection vessel 40 cooperating with outlet 18. As shown in FIG. 5, a slurry layer 42 remains affixed to all of the microchannel walls 27 at the completion of this process.

Thereafter, slurry layer 42 is permitted to dry for a period of time sufficient to remove most of the liquid phase from the slurry layer. As shown in FIG. 6, microcell 12 coated with slurry layer 42 is positioned within a heat source 44 and is heated to a temperature sufficient to cure and bind slurry layer 42 to the microchannel walls 27. Generally speaking, microcell 12 coated with slurry layer 42 may preferably be heated within an air atmosphere 46. Following heating, coated microreactor 10 includes a solid coating layer including a catalyst support, a binder obtained from a sol-gel material and a catalyst well dispersed throughout the thickness of coating layer 48. In one embodiment, coating layer 48 covers all of the internal wall surface within coated microreactor 10.

The above-described process may be repeated numerous times to apply additional slurry layers 42 atop of preceding slurry layers 42 resulting in a number of solid coating layers 48. Preferably, the coating layers 48 are each at least 6 microns thick. In addition, coating layer 48 may be applied in a two-step process (not shown) in accordance with such a process, slurry 34 does not include a catalyst. A catalyst support containing slurry is delivered, removed, dried, and heated in accordance with the steps described above, and thereafter, a solution containing a desired catalyst is delivered into the slurry coated microchannel 14, either before, or after heating in order to impregnate the catalyst support containing slurry layer with the catalyst. The disclosed coating may also be applied in this method by, for example, dip coating, brushing, spraying, and sputtering.

Although the microcell 12 used to form coated the disclosed microreactor 10 may be made a number of different ways, a preferred method of manufacturing a microcell 12 for the microreactor 10 includes the steps of, forming, under a vacuum (to avoid trapping any bubbles of gas), a first mixture of an organic medium and a material that is a precursor for glass, glass ceramic, ceramic, or a combination thereof, on a first substrate made of a material selected from glasses, glass ceramics, ceramics, metals, semiconductors such as silicon or combinations thereof. In accordance with this "vacuum-assisted micromolding process," the precursor material concerned is preferably compatible in terms of thermal expansion coefficient with the material constituting the first substrate. The vacuum-forming is preferably implemented under conditions which confer at least a minimum amount of mechanical strength to the shapes generated.

The formed mixture is then preferably presintered by applying appropriate heat treatment to the assembly including the first substrate and the formed mixture (the presintering serves to eliminate the organic medium and to consolidate the structure). A second substrate made of a material selected from glasses, glass ceramics, ceramics, metals, semiconductors such as silicon or combinations thereof is then preferably applied, which material may be identical or different from that of the first substrate, the material being compatible in terms of thermal expansion coefficient with substantially all of the precursor materials with which it may come into contact. The second substrate being involved may be either untreated, coated on one of its faces with a second mixture of a thermoplastic medium and a material that is a precursor for glass, glass ceramic, ceramic, or a combination thereof, which mixture is optionally identical to that used on the first substrate, is not vacuum-formed, is optionally presintered, and in any event is compatible with the second substrate and with the first mixture, or indeed coated on one its faces with such a second mixture which has previously been vacuum-formed and presintered in succession. The two substrates may then be assembled together such that the mixtures optionally present on each of the substrates face each other. Although not required, the above operations may optionally be repeated at least once either identically or with variations concerning the nature of the second substrate, using the assembly that has already been obtained as the bottom or top portion of a structure that includes, in succession, two, three, and/or more cells. The resulting assembly, having one or more cells, may then be heat-treated (fired) so as to bond together the precursor material(s) and the substrates, or so as to bond the different precursor materials together and to each of the substrates on which they have been deposited.

The vacuum-forming can be implemented in various different ways, in particular taking account of the nature of the organic medium mixed in the precursor material. The organic medium in the mixture can be constituted, in particular, by a thermoplastic medium, a thermosetting medium, or a photopolymerizable medium.

Generally speaking, the method may be initiated in one or more of the following ways. The first mixture may be placed on the first substrate prior to application of the mold in the forming operation (in a vacuum enclosure) or the mold may initially be placed on the first substrate, a vacuum established, and then the mixture injected therein. If a thermoplastic medium is used in the mixture, then the mixture may preferably be initially heated, shaped with an appropriate mold, and allowed to cool, after which the mold may be removed. If the medium is a thermosetting medium, then the mixture may be formed at ambient temperature with an appropriate mold, heated once it has been formed, cooled, and then the mold may be removed. If the medium is a photopolymerizable medium, then the mixture may be formed at ambient temperature with an appropriate mold. Once it has been formed, it may be exposed to appropriate radiation (UV-light, X-rays), after which the mold may be removed. As one of skill in the art will recognize, molds used may be prepared and adapted to the desired final shape from suitable master molds, in conventional manner.

Vacuum-forming generates shapes in relief in the mixture of precursor medium and organic material. In characteristic manner, the shapes are obtained by deforming the mixture while it is supported on a substrate. The substrate is preferably not subjected to any etching.

Since the presintering is preferably performed on a structure that is supported, it is simple to perform and the structure retains its planeness. Presintering serves to eliminate a major portion of the organic components from the mixture prior to assembly (prior to closing the structure). Eliminating volatile components from a complex three-dimensional structure may be difficult, since the gases must be able to escape without damaging the structure. The use of substrates made of glass, glass ceramic, ceramic, metal, or semiconductor is particularly advantageous in that, sub-structures can be formed easily without the need to produce and handle such sub-structures in a self-supporting configuration, which would be fragile. The structures do not sag or become distorted, thus making it possible to provide channel walls that are far apart and/or wall shapes that are complex, and it is easy to introduce additional parts such as electrical conductors, electrodes, or light conductors on the substrates with the mechanical behavior of the parts being minimally affected and in many cases, unaffected.

In conventional manner, presintering is generally implemented after a material that is inert relative to the precursor material, and that absorbs the organic medium, has been applied to the formed mixture. This minimizes the extent to which the formed mixture may sag or collapse. The absorbent material is generally powdered or sprayed onto the formed mixture for presintering.

When operations are not repeated, the disclosed method makes it possible to provide a single cell device (by assembling together first and second substrates; one of the substrates then acts as a bottom while the other acts as a cover plate). When operations are repeated, the method makes it possible to provide a device comprising n cells, using one or more common substrates. Such one or n cell devices can then be secured to one another by using a joining material, in particular an adhesive. The disclosed devices having one stage, n cells with common substrates, n stages stuck to one another (no common substrate), or n cells, some of them having common substrates and some of them having no common substrate, can each be used in a vertical position, in a horizontal position, in an inclined position, or in some other orientation.

The disclosed method for obtaining any element of the final device can be implemented in three main variant manners according to the type of cover plate involved. As mentioned above, the second ($n^{th}$) substrate can be applied to the presintered mixture of the first ($n-1^{th}$) substrate, untreated, (although this variant is not preferred, it is certainly not excluded), coated with an optionally presintered second mixture, the second mixture is preferably in the form of a uniform layer that has not been shaped, it can optionally be presintered and if it has not been presintered, then contact with the presintered first mixture is improved, and coated with a second mixture that has been vacuum-formed and presintered (like the first mixture). This exemplary implementation is advantageously performed with the two substrates in alignment in order to take advantage of the complementary shapes formed as recesses or channels in the mixtures. This makes it possible in the disclosed microfluidic reactors to obtain significant aspect ratios, which ratios may be greater than about 5.0.

In addition to the above, the disclosed method can include additional processing. Passages may be provided by drilling, for example, to allow fluid circulation, to allow such fluids to enter and leave, and indeed, to allow them to pass from a channel in one element to a channel in another element. Drilling operations may also be performed on parts that are to be assembled together, advantageously through the presintered mixtures. In addition, one or more additional parts can be inserted, in particular, parts of the type specified above (e.g., electrical conductors, electrodes, light conductors, to name a few) on one of the substrates involved and/or in the precursor mixture involved, or indeed in an intermediate layer that is inserted between at least one of the first and second substrates and the corresponding first or second mixture. During manufacture of each of the elements of the disclosed device, it is entirely possible to slide at least one intermediate layer (a fine layer of silicon (Si), a layer of glass, of ceramic, or glass ceramic) between a substrate and the precursor mixture for generating a portion of the reaction cell, in particular, electrodes that can be formed by conventional printing, photolithography, or electroforming techniques.

Figure 7:
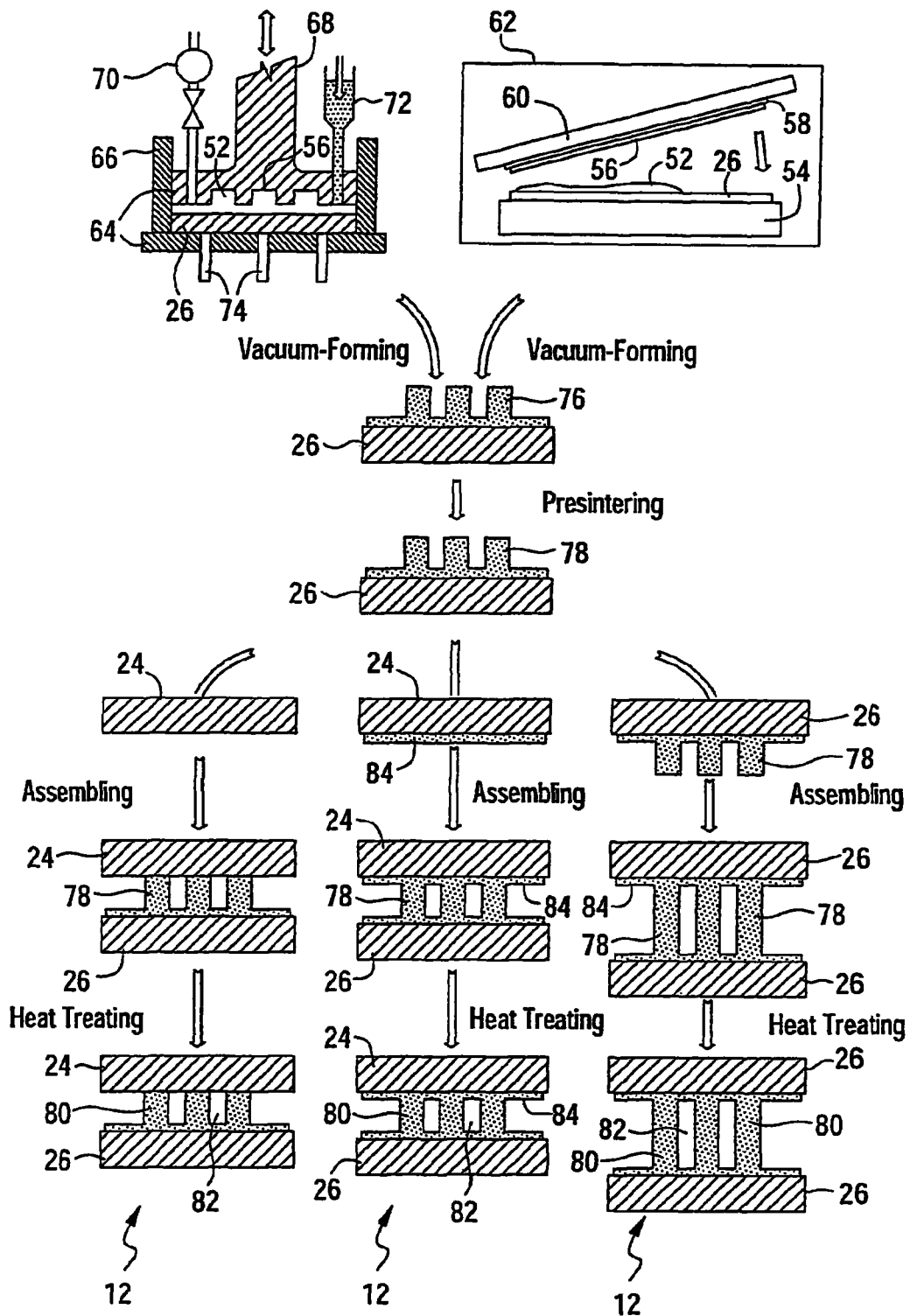
FIG. 7 schematically illustrates a method of manufacturing a microcell used in making a disclosed coated microstructure.

Exemplary embodiments of a method of manufacturing a microcell 12 for the disclosed coated microreactor are shown in FIG. 7. Initially, in one embodiment, microstructures in relief are made on a substrate 26 (e.g. of glass or of silicon) with said microstructures being made by molding a mixture 52 including glass frit and a thermoplastic medium (for example). Two different techniques are shown diagrammatically. The technique in the upper right corner of FIG. 7 is similar to the technique described in U.S. Pat. No. 5,853,446, and more particularly to the method described in Example 4 of that patent, the disclosure of which is hereby entirely incorporated herein by reference. In accordance with the method, mixture 52 is deposited on the substrate 26. Substrate 26 carrying the mixture 52 is placed on a thermostatically controlled support 54. A suitable mold made of elastomer 56 is prepared in advance. The mold is positioned on a support 58, which is itself secured to a heater element 60. The assembly including elements 60, 58, and 56 is degassed in a vacuum inside the enclosure 62 prior to being applied to the mixture 52 in the enclosure. Such degassing preferably degasses the mixture 52 and prevents any bubbles of gas from being trapped in the formed mixture.

The method in the upper left corner of FIG. 7 is based on injecting mixture 52 into the mold 56 after it has been placed in advance on the substrate 26. The assembly including the substrate 26 and the mold 56 is positioned between two hot plates 64 inside a jacket 66 suitable for opening and closing under the action of a piston 68. After the inside of the mold 56 has been evacuated by an evacuation mechanism 70, the mixture 52 is injected through an injector 72. At the end of the thermoforming process, the thermoformed assembly is ejected using ejector mechanism 74 acting through the bottom hot plate.

After the vacuum-forming step has been implemented, a mixture 76 is obtained that is secured to substrate 26, which mixture includes mixture 52 that has been thermoformed. The assembly is then subjected to heat treatment so that mixture 76 is presintered. It is then referenced as 78 and consists mainly of heat-treated glass frit.

In parallel, a cover plate is prepared for the intended device. In one example embodiment, the cover plate includes a substrate 24 (optionally identical to substrate 26) which is placed untreated on mixture 78. The assembly is then subjected to heat treatment under suitable conditions to cause the three components of the resulting microcell 12, i.e, the substrates 26 and 24 with the fired one-piece microstructure 80 between them, to be securely united. Generally speaking, the microstructure preferably defines at least one channel 82.

In an alternative embodiment, the cover plate includes a substrate 24 (optionally identical to the substrate 26) coated in a uniform layer of a mixture 84 of glass frit and a thermoplastic medium (for example). Mixture 84 is optionally presintered. It therefore optionally includes significant quantities of thermoplastic medium. The resulting assembly is subjected to heat treatment under appropriate conditions for generating a microcell 12 in accordance with the invention. Its microstructure 80 plus 84 defines the channels 82.

In another exemplary embodiment, the cover plate is of the same type as the bottom plate. It includes a substrate (the same substrate as 26 in the example shown) having a presintered thermoformed mixture secured thereto (the same mixture 78 in the embodiment shown). Thus, by placing the patterns in relief so that they are in alignment with each other, it is possible to obtain channels 8 of large volume (and presenting significant aspect ratios). The resulting assembly is subjected to heat treatment under suitable conditions to generate a microcell 12.

Further details relating to the disclosed method of manufacturing a microfluidic reactor may be found in U.S. Pat. No. 6,595,232.

Alternatively, a glass microcell 12 used to manufacture the microreactor may also be manufactured by a wet etching process or other processes. Microcells made of metal or other material may be manufactured in accordance with processes that may be envisioned by one skilled in the art. It should be pointed out the disclosed coated microstructures are not limited in their production to the micromolding process described above. Rather, the coating(s) may be provided according to the disclosed methods to any microreactor made by any process with any material.

The disclosed microreactor and methods may be further understood with reference to the following detailed examples, which are intended to be illustrative, rather than limiting.

Example 1

Catalytic Glass Microreactors with Sol-Bound Coating

A durable alumina coating was provided on the interior channel walls of a glass microreactor made by a vacuum-assisted micromolding process. The coating was supplied to a microcell, a square-celled microreactor having cross-sectional microcell dimensions of about 0.5 mm×0.7 mm.

To provide an alumina coating on the interior channel walls of this microreactor, a quantity of aluminum isopropoxide (99% by wt.) was first hydrolyzed by forming a mixture with hot water at about 75° C. with a molar ratio of water to alkoxide of about 45. The mixture was then peptized by the addition of nitric acid at a molar ratio of about 0.25 mol of acid per mol of alkoxide and heated at about 90° C. to produce an alumina sol binder solution, as for example in U.S. Pat. No. 3,941,719, incorporated herein by reference, is then obtained after.

A quantity of a high-surface-area gamma alumina powder (surface area of about 200 $m^2/g$) is then added to this alumina sol to produce a coating slurry for application to the microchannel walls of the microcell. A weight addition of about 0.3-0.4 parts, and preferably 0.35 parts, powdered alumina to 1 parts of alumina sol was used to form an alumina slurry and the viscosity was then adjusted by the addition of an appropriate amount of water.

To form the alumina coating, the microreactor channels were filled with the alumina slurry, allowed to drain using, for example, forced air circulation, and the residual coating layer was then dried and cured by heating the microreactor and coating to a temperature of about 450° C., effectively binding the coating to the channel walls. The filling, draining, drying and curing steps were then repeated to deposit two additional coating layers onto the walls of the channels.

The firing schedule used to consolidate the coating in this example was as follows: First, the coated microcell was exposed to heat in order to uniformly increase the temperature of the microcell and coating from room temperature to 150° C. in forty (40) minutes. Thereafter, the microcell and coating were maintained at a temperature of 150° C. for a period of thirty (30) minutes. The temperature was then uniformly raised from 150° C. to 450° C. over a sixty (60) minute time period and maintained at 450° C. for an additional sixty (60) minutes. Thereafter, the coated microreactor was cooled down from 450° C. to room temperature over a one-hundred-twenty (120) minute time period.

The coating was well-adhered and durable, exhibited good resistance to thermal shock, and was designed to withstand prolonged exposure to flowing liquid and gas-liquid feed streams, potentially carrying solid particles, without chipping or spalling.

Example 2

Catalytic Glass Microreactors with Sol-Bound Coating

The experiment described above in Example 1 was carried out under substantially the same conditions, but the glass microcell made by a vacuum-assisted micromolding process was replaced with a glass microcell made by a wet etching process. Substantially similar results were obtained.

Example 3

Catalytic Metallic Microreactors with Sol-Bound Coating

The experiment described above in Example 1 was carried out under substantially the same conditions, but a metallic microcell, and thus a metallic microreactor as described in DE 3926466 was utilized in lieu of a glass microcell. Substantially similar results were obtained.

Example 4

Pt Catalyst on Alumina Coated Glass Microreactor

To prepare a structured platinum catalyst a catalyst support in the form of an alumina-coated glass microreactor was prepared substantially in accordance with the procedure described above in Example 1. A catalyst preparation was then made by dissolving $H_2PtCl_6$ in about 80.0 ml of water to form an aqueous solution containing about 0.4% platinum by weight.

The coated microchannels were then filled with the catalyst solution described above for the purpose of impregnating the support coating with platinum throughout its thickness. The targeted platinum loading for the coating layer(s) was about 0.3% by weight, calculating the platinum content as the oxide. Following impregnation of the coating layer(s) with the catalyst solution, the solution-treated supported was then dried and thereafter heated in air to a temperature of approximately 400° C. to vaporize the water and convert the platinum compound to platinum. The microreactor was then cooled to room temperature and examined.

Electron microprobe examination of the catalyst impregnated coating thus prepared exhibited a good distribution of the catalyst throughout the coating layer.

Example 5

NiO Catalyst on Alumina Coated Glass Microreactor

To prepare a structured NiO catalyst, a catalyst support in the form of an alumina-coated glass microreactor was made in accordance with the procedure described in Example 1. For this example, a catalyst was then prepared by dissolving $Ni(NO_3)_2$ in water to form an aqueous solution.

The coated microreactor channels were then filled with the catalyst solution for the purpose of impregnating the coating with nickel oxide throughout its thickness. The targeted nickel loading for the coating was about 3% by weight. Following the impregnation of the coating with the catalyst solution, the solution-treated support was dried and then heated in air to 400° C. to vaporize the water and convert the nickel compound to nickel oxide, and then cooled to room temperature and examined.

Electron microprobe examination of the catalyst-impregnated coating thus prepared showed a good distribution of the catalyst throughout the coating.

Example 6

Alumina-Supported Pt Catalyst on Microreactors

An alternative method of making a structured catalyst in a microreactor involved uniformly impregnating a powdered oxide filler material with a catalyst prior to combining it with a selected sol binder solution. To provide a catalyzed alumina coating in accordance with this method the procedure of Example 1 was repeated, except that the gamma alumina powder introduced into the coating slurry was a powder that had first been catalyzed with platinum before being combined with the alumina binder sol.

A catalyzed alumina powder suitable for this purpose was prepared by treating a quantity of high-surface-area gamma alumina powder (surface area of about 200 m²/g) with a $H_2PtCl_6$ catalyst solution such as in Example 3 above. Powder treatment was made by addition of the powder to the catalyst solution, while mixing, followed by drying of the thus-impregnated powder, and then heating in air at 400° C. The catalyzed alumina powder thus prepared was added to the alumina sol of Example 1, and a glass microreactor was then coated with the resulting catalyst-containing slurry. The product of this procedure was a coated structured platinum catalyst wherein a uniform, gradient-free distribution of the platinum catalyst across the entire thickness of the alumina coating was provided.

Example 7

Molecular Sieve Coating in a Glass Microreactor

Coatings incorporating molecular sieves such as zeolites for the acceleration or control of selected catalytic reactions can also be effectively provided through the use of sol binders. In one illustrative example, the procedure of Example 1 was followed except that a powder mixture consisting of 40 parts by weight of high-surface-area gamma alumina powder (surface area of about 200 m²/g) and 60 parts by weight of a commercial H—Y zeolite was used in place of the gamma alumina to prepare a coating slurry as therein described. Well-bonded, crack-free coatings were readily provided with slurries of these compositions.

Other additives that can be used in combination with the disclosed coating systems are materials that can increase the thermal conductivity and/or heat capacity of the coating. Specific examples of such additives include powders of silicon carbide (SiC) or silicon nitride (SiN). Coatings of higher heat capacity or conductivity may be useful to help control catalyst temperature in exothermic or endothermic chemical reactions, as well as to reduce the thermal stresses to which the structured catalyst supports may be subjected.

It will be apparent to those skilled in the art that various modifications and variations can be made to the disclosed microstructures and methods without departing from the spirit and scope of the invention.

While the various systems and methods of the present invention may have been shown and described with reference to specific embodiments, any and all embodiments may be used in conjunction with any of the systems and methods described herein. Thus, it is intended that the present invention covers modifications and variations, provided they come within the scope of the appended claims and their equivalents.

Any discussion of the background to the invention herein is included to explain the context of the invention. Where any document or information is referred to as "known", it is admitted only that it was known to at least one member of the public somewhere prior to the date of this application. Unless the content of the reference otherwise clearly indicates, no admission is made that such knowledge was available to the public or to experts in the art to which the invention relates in any particular country (whether a member-state of the PCT or not), nor that it was known or disclosed before the invention was made or prior to any claimed date. Further, no admission is made that any document or information forms part of the common general knowledge of the art either on a world-wide basis or in any country and it is not believed that any of it does so.

The invention claimed is:

1. A method of manufacturing a microstructure useful for chemical processing and manufacture, the method comprising:

coating a microchannel with a slurry including a sol-gel binder, the microchannel defined by a plurality of microchannel walls and configured to accommodate chemicals to be processed;

removing a portion of the slurry from the microchannel such that the slurry layer is disposed on or between the plurality of microchannel walls; and heating the microstructure for a sufficient time and at a sufficient temperature to cure and bind the slurry layer to the plurality of microchannel walls producing a cured slurry layer that forms a catalyst support, wherein said coating is performed by one of dip coating, brushing, and spraying, wherein the support comprises a material chosen from at least one of a binder sol, a sinterable particulate solid, and a molecular sieve, and wherein, after the heating step, the method further comprises filling the microchannel with a solution comprising a catalyst to impregnate the cured slurry layer with the catalyst, producing a catalyst-impregnated slurry layer.

2. The method of claim 1, further comprising: heating the catalyst impregnated slurry layer for a sufficient time and at a sufficient temperature to form a catalyst impregnated coating on the plurality of microchannel walls.

3. The method of claim 1, further comprising: depositing a frit on a first substrate; molding the frit to define a microchannel; and covering the molded frit with a second substrate.

4. The method of claim 1, further comprising forming the microstructure walls utilizing a vacuum assisted micromolding process.

5. The method of claim 1, further comprising forming the microstructure walls utilizing a wet etching process.

* * * * *